United States Patent [19]

Matsumoto et al.

[11] Patent Number: 5,725,079
[45] Date of Patent: Mar. 10, 1998

[54] FRICTIONAL ENGAGEMENT DEVICE

[75] Inventors: Shogo Matsumoto; Kiyohito Murata, both of Susono, Japan

[73] Assignee: Toyota Jidosha Kabushiki Kaisha, Toyota, Japan

[21] Appl. No.: 713,446

[22] Filed: Sep. 13, 1996

[30] Foreign Application Priority Data

Sep. 14, 1995 [JP] Japan .................. 7-236829

[51] Int. Cl.$^6$ .................. F16D 25/02; F16D 25/0638
[52] U.S. Cl. .................. 192/52.5; 192/54.3; 192/54.5; 192/54.52; 192/85 AA; 475/146; 188/72.2
[58] Field of Search .................. 192/52.5, 54.5, 192/54.52, 54.3, 70.23, 85 AA, 93 A; 188/72.2; 475/125, 126, 146, 148

[56] References Cited

U.S. PATENT DOCUMENTS

| | | |
|---|---|---|
| 3,199,374 | 8/1965 | O'Malley et al. . |
| 3,717,229 | 2/1973 | Perlick . |
| 3,733,920 | 5/1973 | Annis . |
| 5,031,746 | 7/1991 | Koivunen .................. 192/85 AA |
| 5,511,644 | 4/1996 | Murata .................. 192/85 AA |
| 5,593,016 | 1/1997 | Murata et al. . |
| 5,603,396 | 2/1997 | Murata et al. .................. 192/85 AA |
| 5,638,933 | 6/1997 | Matsumoto et al. .................. 192/52.5 |

FOREIGN PATENT DOCUMENTS

2-66328  3/1990  Japan .

*Primary Examiner*—Richard M. Lorence
*Attorney, Agent, or Firm*—Oblon, Spivak, McClelland, Maier & Neustadt, P.C.

[57] ABSTRACT

A frictional engagement device for engaging a pair of members relatively rotating around a common axis is improved to obtain a smooth action. A first frictional engaging element is fitted unrotatably and axially movably to one of the relatively rotating member. A second frictional engaging element is unrotatably and axially movably fitted to the other of the relatively rotating member and disposed engageable to the first frictional engaging element. A first cam member which is axially movably fitted to one of the relatively rotating member and disposed apart from the second frictional engaging element has a slanted cam surface. A second cam member which is disposed adjacent to the first cam member on a side of the second frictional engaging element has a slanted cam surface parallelly opposing the cam surface of the first cam member. A piston means which is fitted to the second cam member has a surface engageable with the second frictional engagement element. A spring seat is disposed, not touching the piston means, in a space formed between the piston means and the second cam member. A return spring for biasing the second cam member toward the first cam member is fixed to an unmovable member on one end and fitted the spring seat on the other end. A pushing means selectively pushes the piston means onto the second frictional element through the second cam member to cause a frictional engagement between the piston means and the second frictional element so that the piston member being rotationally dragged with the second cam member and generates a cam force to engage the first frictional engaging element and the second frictional element. A friction decreasing means disposed between the spring seat and the second cam member decreases the friction between the spring seat and the second cam member to prevent the return spring from being rotationally dragged by the second cam member when the second cam member is rotationally dragged.

11 Claims, 9 Drawing Sheets

FRICTIONAL ENGAGEMENT DEVICE

BACKGROUND OF THE INVENTION

1. Field of the Invention

The present invention relates to a frictional engaging device, especially to a frictional engaging device used in an automatic transmission.

2. Description of the Related Art

The assignee of the present invention proposed a frictional engaging device, in a copending U.S. patent application Ser. No. 08/405,892, which has a cam mechanism disposed between two relatively rotating members to generate an axial thrust force so as to engage the relatively rotating members.

In the device, a return spring is employed to return the cam mechanism to a condition generating no axial thrust force for disengaging the engaged members.

The return spring is attached to an unmovable member such as a transmission case at one end, and to a rotating cam member at the other end.

Such a return spring generates unstable biasing force and has less durability, since it expands and contracts unevenly due to a force which acts in a direction other than a direction of expansion.

SUMMARY OF THE INVENTION

An object of the present invention is to provide a frictional engaging device with a cam mechanism for an automatic transmission having a return spring which can evenly expand and contract.

According to the present invention there is provided a frictional engagement device, for engaging a pair of members relatively rotating around a common axis, which comprises a first frictional engaging element fitted unrotatably and axially movably to one of the relatively rotating member, a second frictional engaging element unrotatably and axially movably fitted to the other of the relatively rotating member and disposed engageable to the first frictional engaging element, a first cam member axially movably fitted to one of the relatively rotating members and disposed apart from the second frictional engaging element and having a slanted cam surface, a second cam member disposed adjacent to the first cam member on a side of the second frictional engaging element and having a slanted cam surface parallelly opposing the cam surface of the first cam member, a piston means fitted to the second cam member and having a surface engageable with the second frictional engagement element, a spring seat disposed, untouchable by the piston means, in a space formed between the piston means and the second cam member, a return spring for biasing the second cam member toward the first cam member fixed to an unmovable member on one end and being fitted the spring seat on the other end, a pushing means for selectively pushing the piston means onto the second frictional element through the second cam member to cause a frictional engagement between the piston means and the second frictional element so that the piston member being rotationally dragged accompanying the second cam member and generating cam force for engaging the first frictional engaging element and the second frictional element, and a friction decreasing means disposed between the spring seat and the second cam member for decreasing the friction between the spring seat and the second cam member so preventing the return spring from being rotationally dragged by the second cam member when the second cam member is rotationally dragged.

The present invention will be described in more detail below with reference to the preferred embodiments illustrated in the attached drawings.

DESCRIPTION OF THE PREFERRED EMBODIMENTS

Figure 1:
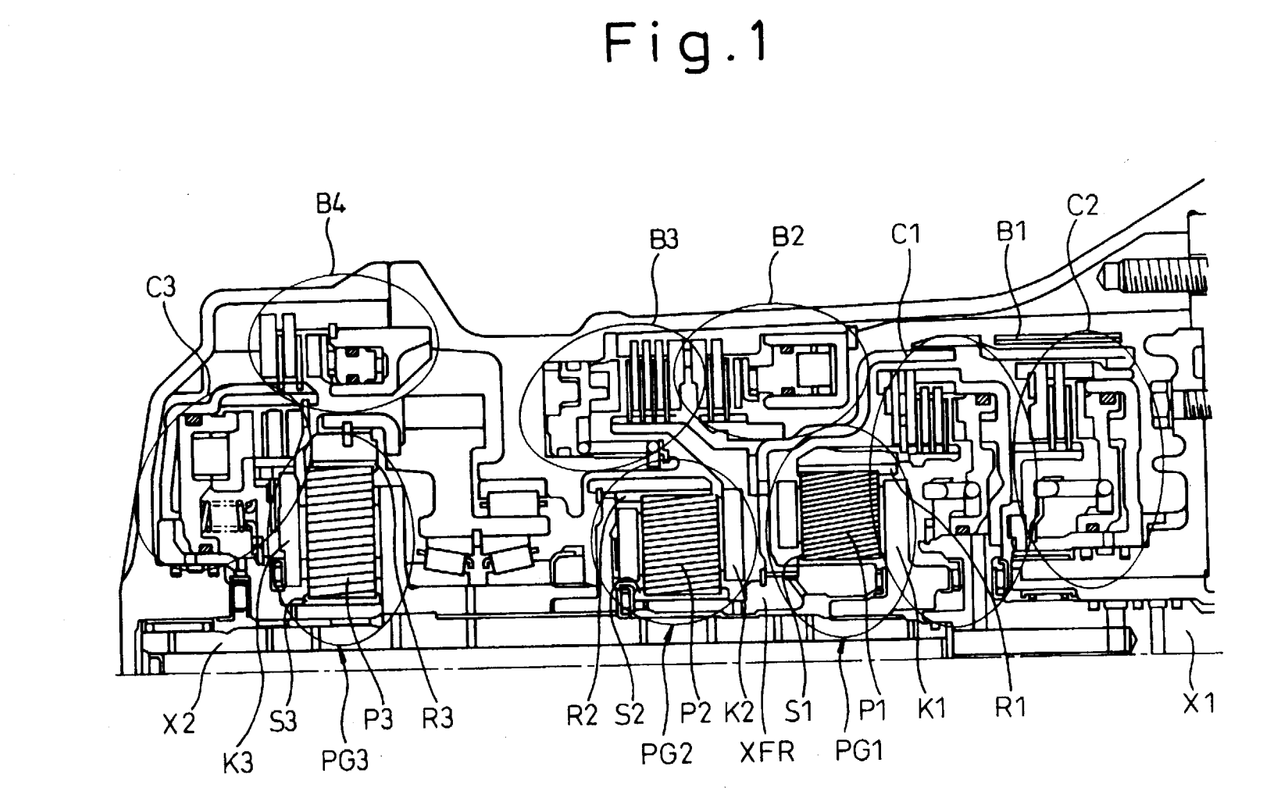
FIG. 1 is a view illustrating an overall structure of an automatic transmission to which the present invention is applied.

FIG. 1 illustrates an overall structure of an automatic transmission having four forward gears and one reverse gear in which the present invention is applied.

The automatic transmission comprises three sets of planetary gear units and plural frictional engagement devices for engaging and disengaging ring gears, sun gears, carriers composing the planetary gear units to and from each other, the details thereof being as follows:

- X1 represents an input shaft which is connected to an output shaft (not shown) of a torque converter (not shown);
- PG1, PG2 and PG3 represent a front planetary gear unit, a rear planetary gear unit and an O/D planetary gear unit, respectively;
- R1, R2 and R3 represent a front planetary ring gear, a rear planetary ring gear and an O/D planetary ring gear, respectively;
- K1, K2 and K3 represent a front planetary carrier, a rear planetary carrier and an O/D planetary carrier, respectively;
- S1, S2 and S3 represent a front planetary sun gear, a rear planetary sun gear and O/D planetary sun gear, respectively, and S1 and S2 are permanently connected to each other by connecting shaft XFR.
- C1 represents a first clutch for engaging/disengaging the input shaft X1 to and from the front planetary ring gear R1;

C2 represents a second clutch for engaging and disengaging the input shaft X1 to and from the connecting shaft XFR;

C3 represents a third clutch for engaging and disengaging the O/D planetary carrier K3 to and from the O/D planetary sun gear S3;

B1 represents a band-type first brake for locking the connecting shaft XFR;

B2 represents a second brake for locking the connecting shaft XFR;

B3 represents a third brake for locking the rear planetary carrier K2;

B4 represents a fourth brake for locking the O/D planetary sun gear S3.

The frictional engaging device according to the present invention is applied to the second brake B2, the third brake B3 and the fourth brake B4.

The below described detail description is of the second brake B2.

Figure 2:
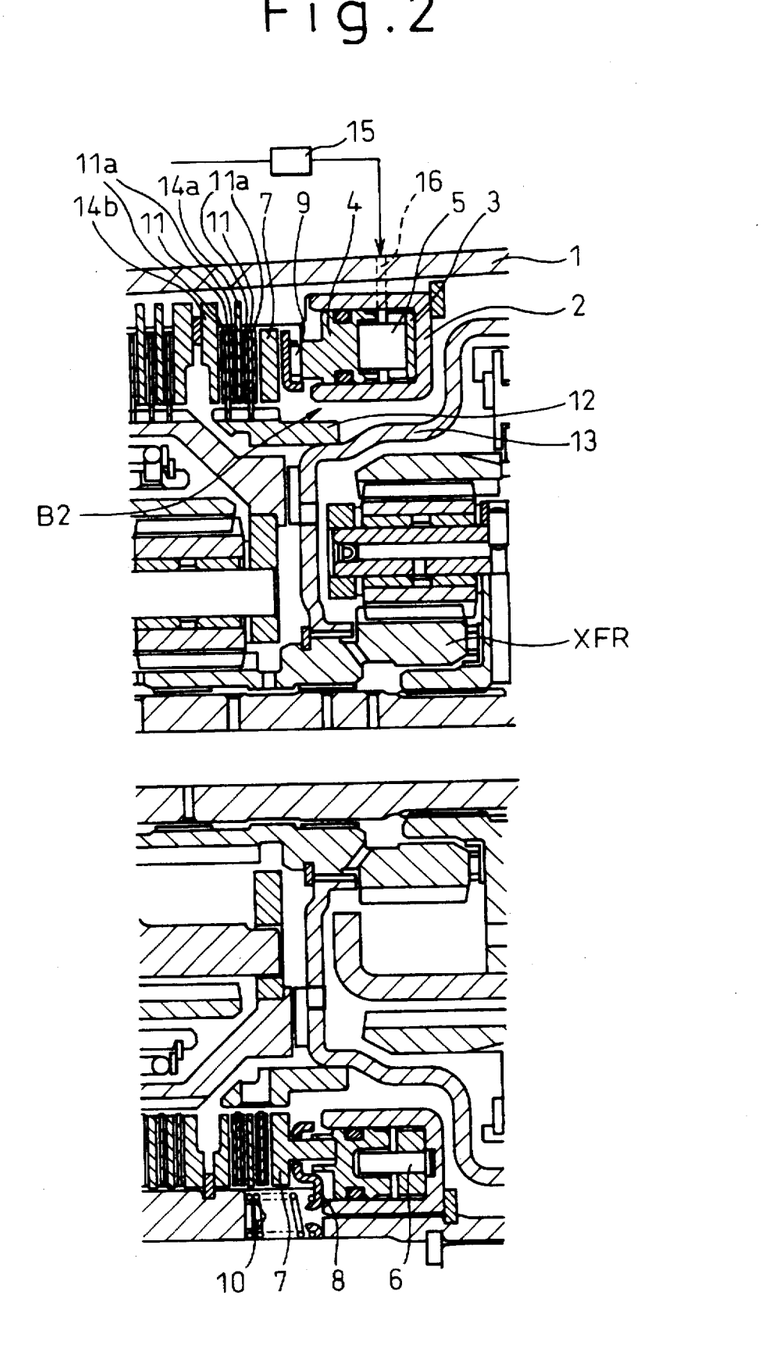
FIG. 2 is a sectional view of the first embodiment of the present invention applied to a second brake B2 of an automatic transmission.

FIG. 2 is a sectional view of a first embodiment of the present invention applied to the second brake B2.

A piston housing 2 is fixed to a transmission case 1. In the piston housing 2, a first cam member 3 and a second cam member 4 are disposed with an interposing cam roller 5 therebetween.

The second cam member 4 is rotatable in the piston housing. However, the rotational range is limited by a stopper pin 6 which is fixed to the piston housing 2 and extends through the first cam member 3. The piston member 7 is engaged to the second cam member 4 with interposing spring seat 8 therebetween.

Further, roller bearings 9 are disposed between the spring seat 8 and the second cam member 4.

A return spring 10 which is attached to the transmission case 1 always pushes the spring seat 8 to the right in the figure.

Reference numeral 11 represents brake discs, which have frictional material 11a on the both side surfaces. The brake discs 11 are splined to a brake disc support member 12. The brake disc support member 12 is fixed to the connecting shaft XFR through a drum 13.

Reference numerals 14a and 14b represent brake plates which are selectively engaged with brake discs 11. The brake plates 14a and 14b are splined to the transmission case 1. However, the axial movement of the brake plate 14b to the left in the figure is limited.

Reference numeral 15 represents oil supply control valve for managing hydraulic operating oil which is supplied through an oil passage 16 from an oil pump (not shown) to a space between first cam member 3 and the second cam member 4 in the piston housing 2.

Figure 3:
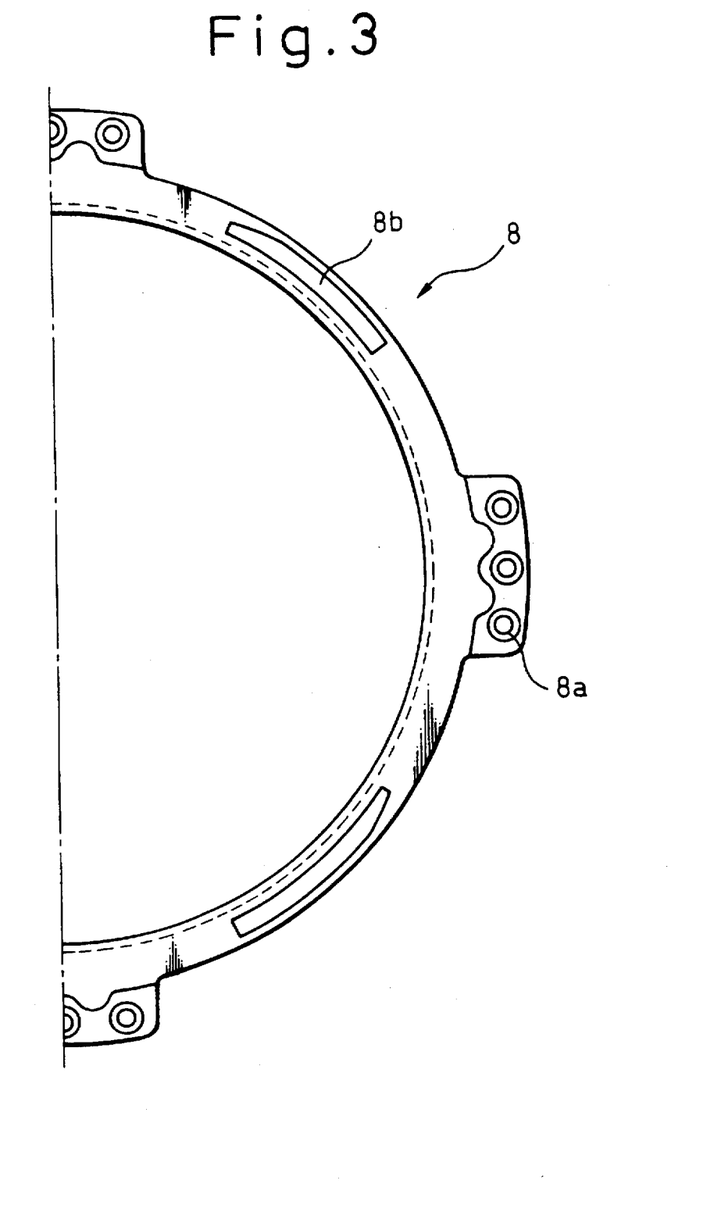
FIG. 3 illustrates a spring seat 8.

FIG. 3 is an axial view of the spring seat 8 from the side of the piston member 7. Reference numeral 8a represents a protuberance for fitting the spring 10 on the spring seat 8. Reference numeral 8b represents an opening for arranging the piston member 7 therethrough.

Figure 4:
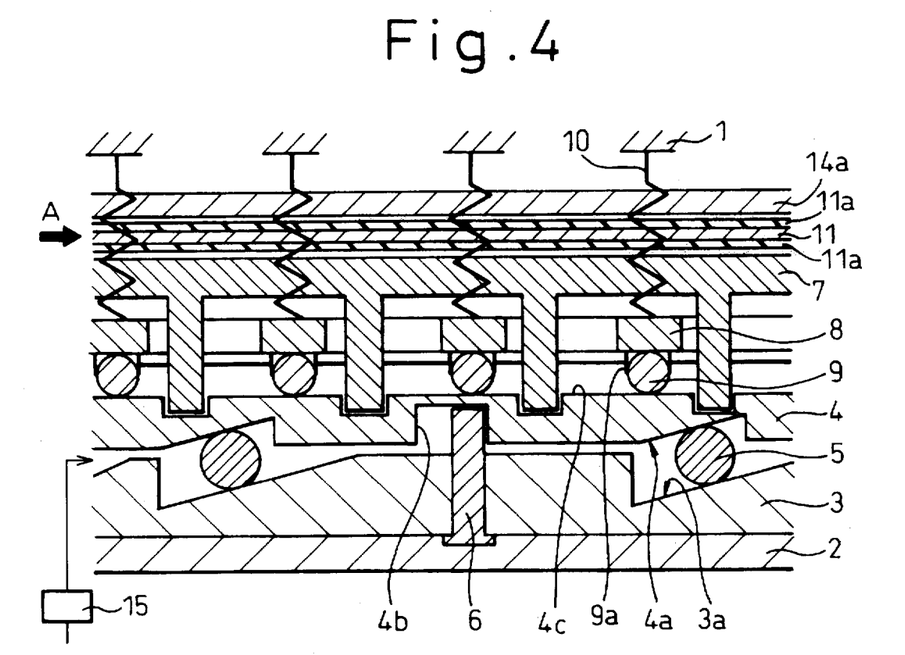
FIG. 4 is a schematic view of an inside of the first embodiment (in a disengaged condition)

FIG. 4 schematically shows the inside of the second brake B2, which is constructed as described above, in the disengaged state. In FIG. 4, only one of the brake discs 11 is shown and only the brake plate 14a is shown. In FIG. 4, a cam surface 3a and a cam surface 4a which are respectively formed on opposing surfaces of the first cam member 3 and the second cam member 4, are shown.

Further, in FIG. 4, axially long cut-offs 4b for receiving stopper pins 6 formed on the second cam member 4 are shown. Reference numeral 9a represents a roller cage. The roller cage 9a is arranged to move with the spring seat 8 and holds the roller bearings 9, thereby preventing the roller bearing 9 from falling off from a surface of the spring seat 8.

The transmission case 1, the piston housing 2 and the first cam member 3 are axially (upward and downward in the figure) and rotationally (leftward and rightward in the figure) unmovable.

The second cam member 4, the piston member 7 and the brake disc 11 are axially and rotationally movable.

The brake plate 14a is axially movable and rotationally unmovable.

In a condition, shown in FIG. 4, brake discs 11 are moving rightward in the figure as shown by arrow A, and the oil supply control valve 15 stops the supply of the hydraulic operating oil, thereby only the biasing force of return spring 10 is acting on the second piston member downward and a clearance between the first cam member 3 and the second cam member 4 is kept at a minimum.

A clearance between the brake disc 11 and the piston member 7, and a clearance between the brake disc 11 and the brake plate 14a are filled with the hydraulic operating oil. A viscous shear force is generated between the piston member 7 and the brake plate 14a, since the oil therebetween is dragged by the brake disc 11. However, the viscous shear force is not strong and the brake disc 11 can continue to rotate.

When hydraulic operating oil is supplied to the clearance between the first cam member 3 and the second cam member 4 by operating the oil supply control valve 15 in the above described condition, the second cam member 4 pushes the piston member 7 toward the brake disc 11. In due course, the opposing surfaces of the piston member 7 and the frictional material of the brake disc 11 are engaged to each other. Then, the piston member 7, with the second cam member 4, is dragged rightward in the figure by the brake disc 11.

Then the cam surfaces 4a of the second cam member 4 climb the cam surfaces 3a of the first cam member 3 through the cam rollers 5, and thereby a cam force is generated. Due to the thus-generated cam force, the piston member 7 pushes the brake disc 11 toward the brake plate 14a, so that the brake disc 11 and the brake plate 14a are engaged with each other. In due course, the brake disc 11 is stopped and the condition shown in FIG. 5 is obtained.

During the above described action, the return spring 10 is shortened and thereby the spring seat 8 is pushed toward the piston member 7 by a force which is greater than the force generating in the condition shown in FIG. 4. However, the spring seat 8 is prevented from being dragged by the piston member 7 by the roller bearings 9 which roll on an inner surface 4c of the second cam member 4.

Figure 5:
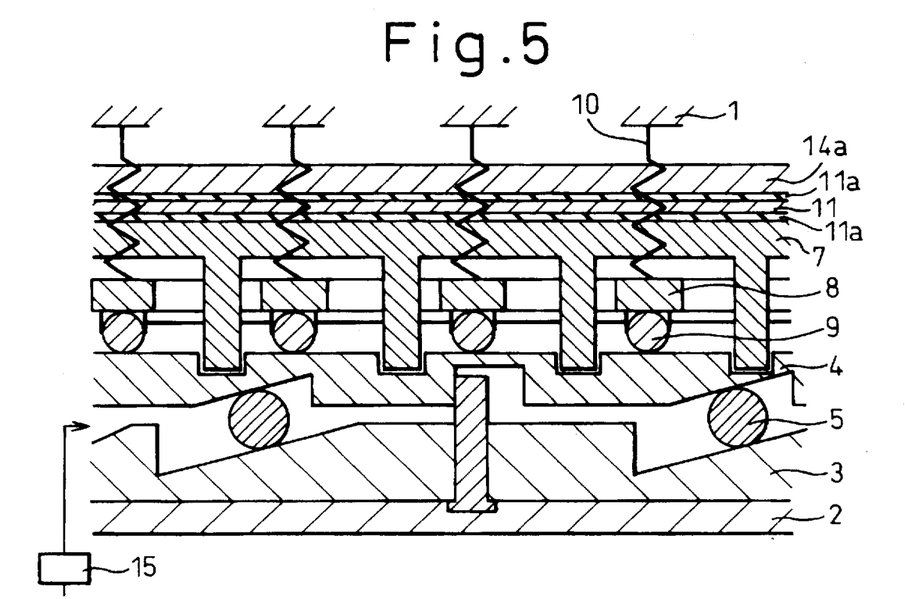
FIG. 5 is a schematic view of an inside of the first embodiment (in an engaged condition)

By draining the hydraulic operating oil from the clearance between the first cam member 3 and the second cam member 4 from the condition shown in FIG. 5, a condition shown in FIG. 4 is obtained. During this procedure the spring seat 8 is also prevented from being dragged by the piston member 7.

Figure 6:
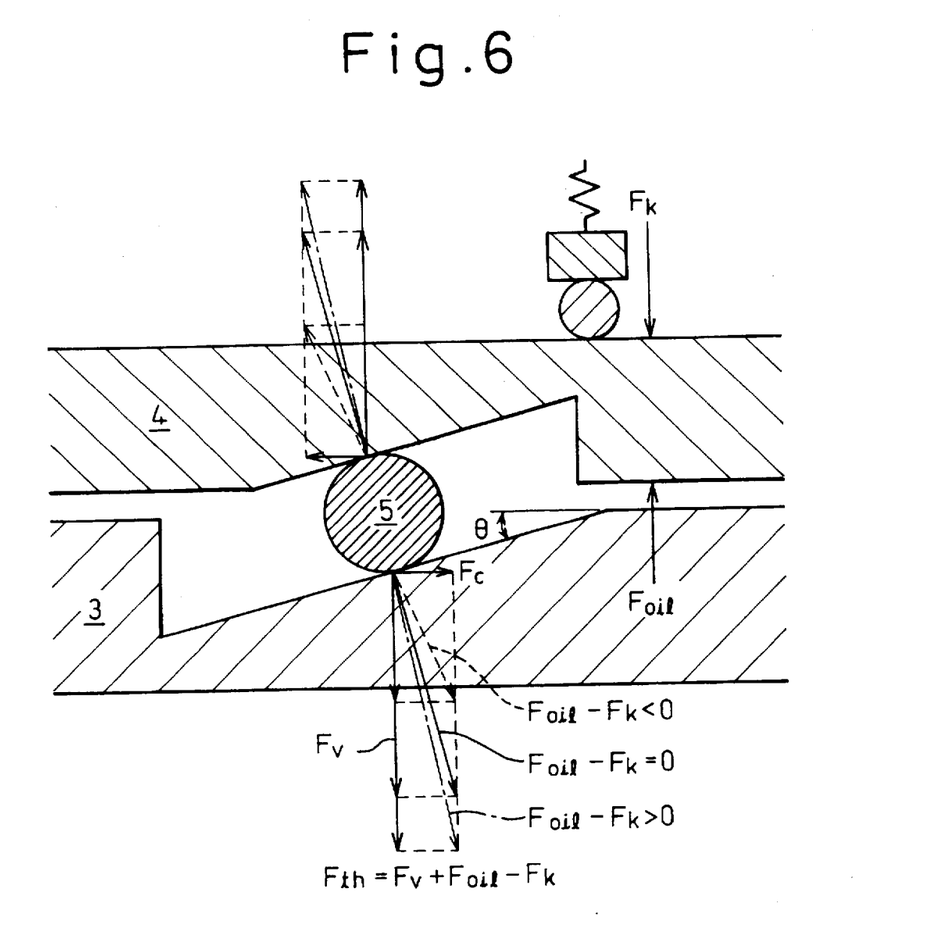
FIG. 6 is a diagram to explain a force acting on a cam mechanism.

In the following a management of the hydraulic operating oil is described with referring FIG. 6. At first, a case of engaging is described.

A torque T acts on the piston member 7, when the hydraulic operating oil is supplied between the first cam member 3 and the second cam member 4 and thereby the piston member 7 contacts with the brake disc 11.

A force $F_c$ which acts on the piston member 7 in a rotational direction is obtained with dividing the T by a rotation radius R from rotation axis, i.e., $F_c = T/R$.

A cam thrust force $F_v$ is caused by the above $F_c$, and explained as follows.

$$F_v = F_c / \tan \theta \tag{1}$$

i.e., $$\tan \theta = F_c / F_v \tag{2}$$

wherein, $\theta$ is a cam angle.

On the other hand, an axial thrust force $F_{th}$ which acts on the second piston member is explained as follows.

$$F_{th} = F_v + F_{oil} - F_k \tag{3}$$

wherein $F_k$ is a biasing force from return spring 10.

$F_{oil}$ is a force from a pressure of the hydraulic operating oil which pushes the piston member 7 through the second cam member 4.

Therefore, the following equation can be obtained.

$$\tan \theta' = F_c / F_{th} \tag{4}$$

wherein, $\theta'$ is an apparent cam angle.

From equations (2) and (4), the following can be deduced.

$\theta' < \theta$, when $F_{oil} - F_k > 0$, $\theta' > \theta$, when $F_{oil} - F_k < 0$.

On the other hand, the cam is not self-tighteningly engaged when $\tan \theta' > \mu$, and the cam is self-tighteningly engaged when $\tan \theta' < \mu$, wherein, $\mu$ is a frictional coefficient between the piston member 7 and the brake disc 11.

Therefore, the second brake B2 is self-tighteningly engaged when the pressure of the hydraulic operating oil is regulated to overcome the biasing force $F_k$ by the return spring 10 and satisfy $\tan \theta' < \mu$.

On the other hand, when the pressure of the hydraulic operating oil is decreased enough to satisfy $\tan \theta' > \mu$, the self-tightening operation finishes, and thereby the second brake B2 starts to slip.

When the pressure of the hydraulic operating oil is further decreased to satisfy $F_{oil} - F_k < 0$, i.e., the biasing force $F_k$ from the return spring 10 overcomes the force $F_{oil}$ from the pressure of the hydraulic operating oil, the second cam member 4 returns to the position 10 where the clearance between the second cam member 4 and the first cam member 3 has the minimum value and the second brake B2 is disengaged.

Figure 7:
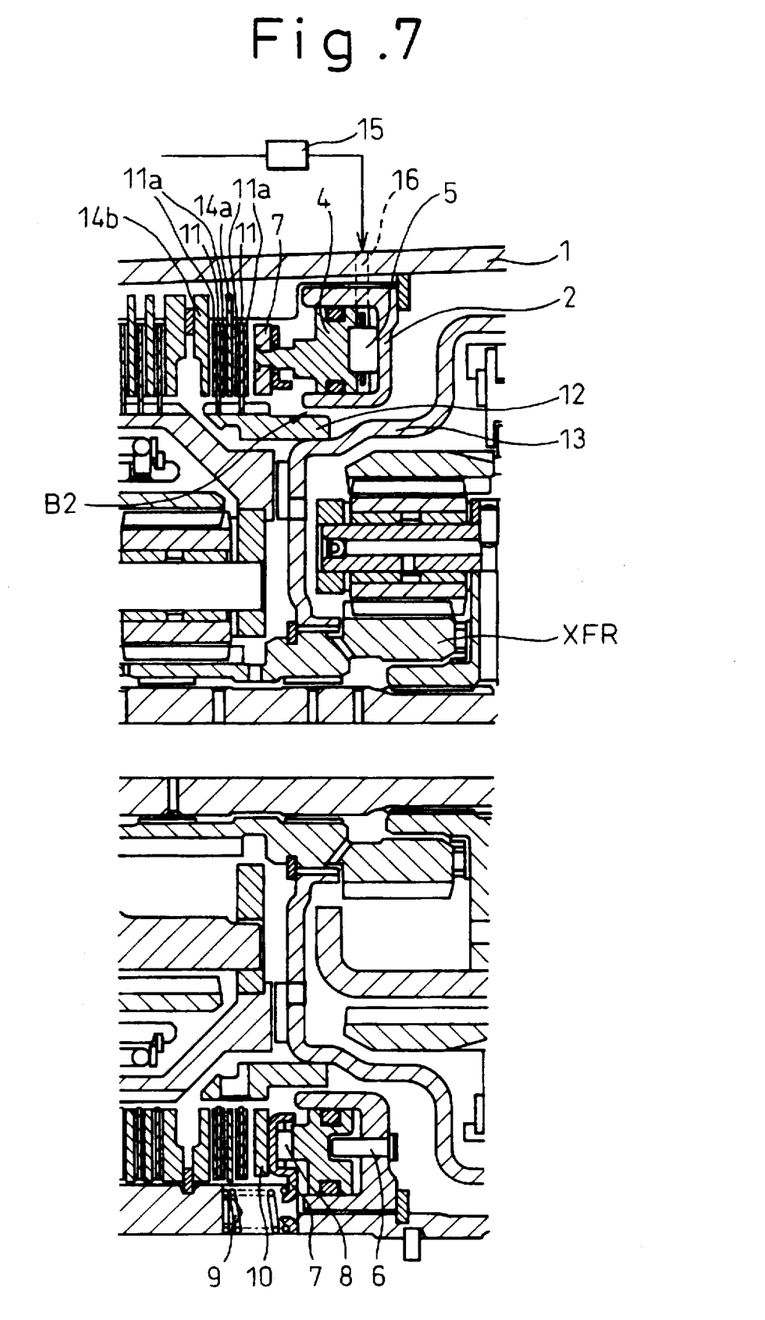
FIG. 7 is a sectional view of the second embodiment of the present invention applied to the second brake B2 of the automatic transmission.

FIG. 7 is a sectional view of the second embodiment of the present invention applied to the second brake B2 of the automatic transmission.

Figure 8:
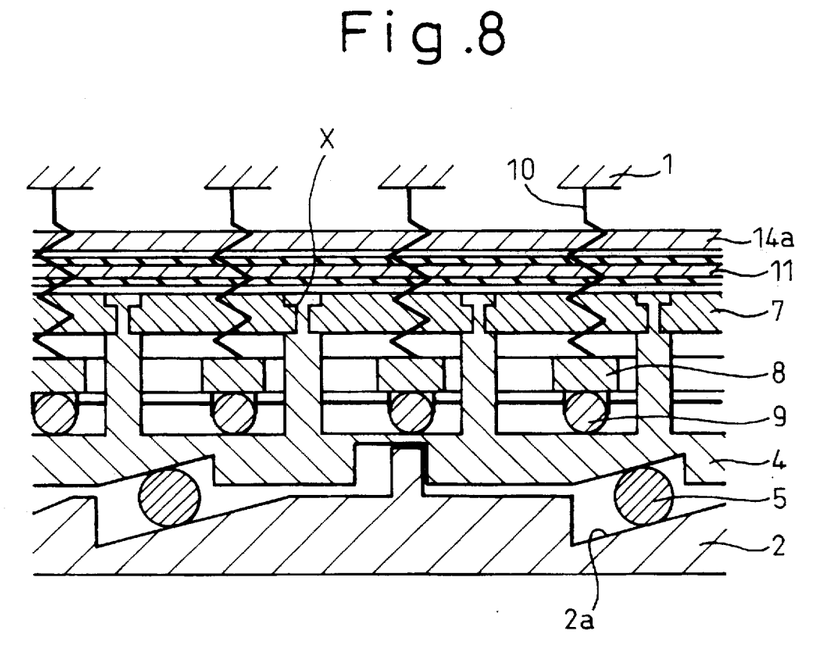
FIG. 8 is a schematic view of an inside of the second embodiment (in a disengaged condition)

FIG. 8 is a schematic view of an inside of the second embodiment by the same manner as the FIG. 5.

In this second embodiment, compared to the first embodiment, the second cam member 4 and the piston member 7 are unified by calking at portion X. Further, a cam surface 2a is directly formed on the piston housing 2, and thereby the first cam member 3 is not needed.

Due to the above described feature, in the second embodiment, the piston member 7 and the first piston member move simultaneously, while in the first embodiment the piston member 7 moves later than the second cam member 4.

Accordingly, the second embodiment can provide a quicker change from an engaged condition to a disengaged condition than the first embodiment.

Figure 9:
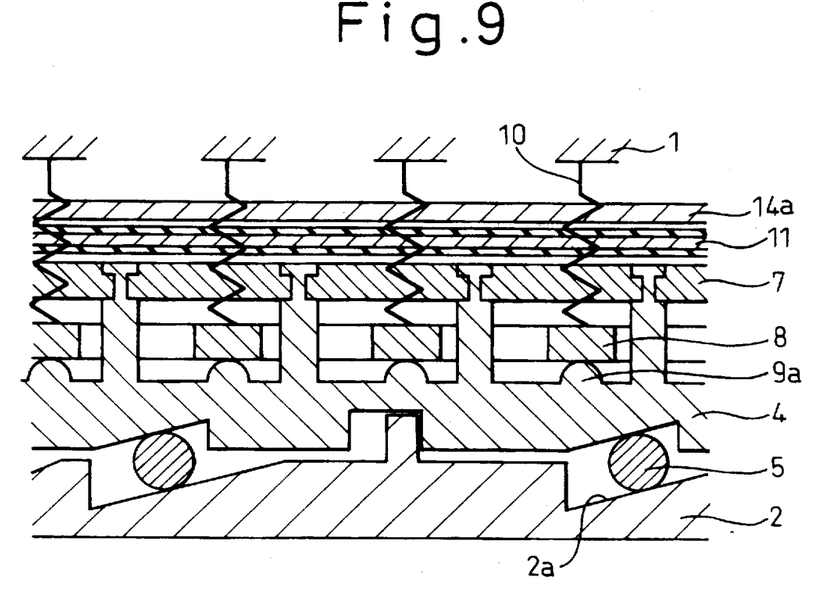
FIG. 9 is a schematic view of an inside of a variation of the "second embodiment" (in a disengaged condition)

FIG. 9 shows a variation of the second embodiment in which semi-cylindrical protuberances 9a formed on the second cam member 4 are employed instead of the roller bearings 9 as means for decreasing friction. By employing the above described feature, this variation requires fewer parts and man-hours for assembly.

Figure 10:
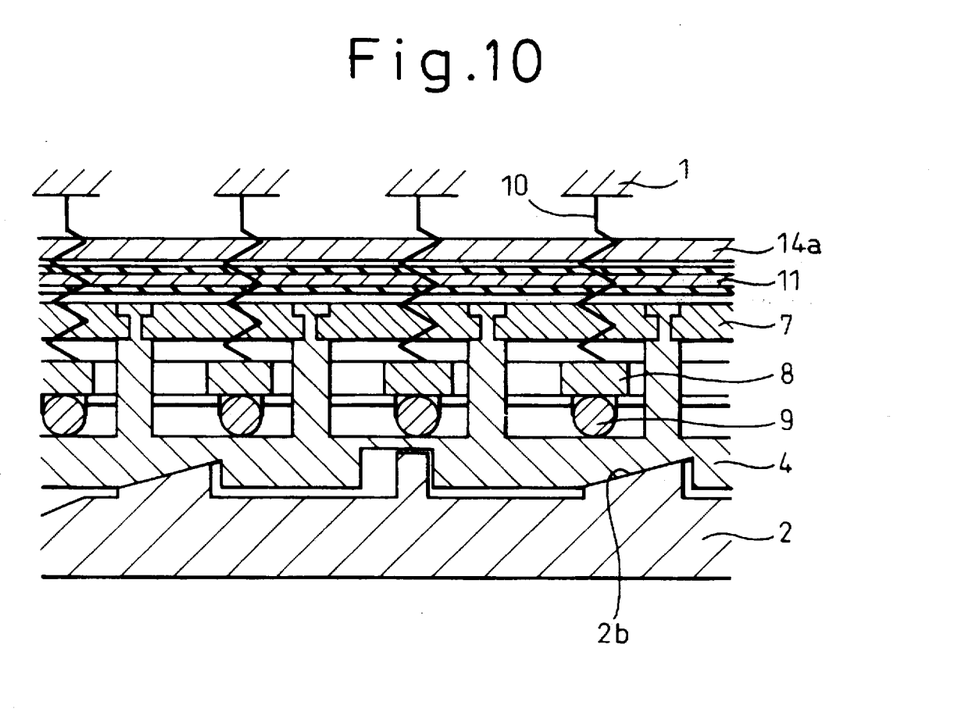
FIG. 10 is a schematic view of an inside of another variation of the second embodiment (in a disengaged condition)

FIG. 10 shows another variation of the second embodiment, in which a cam surface 2b which directly contacts the cam surface 4a of the second cam member 4 is directly formed on the piston housing and thereby the cam roller 5 is deleted. This enables a further decrease in the number of parts.

Figure 11A:
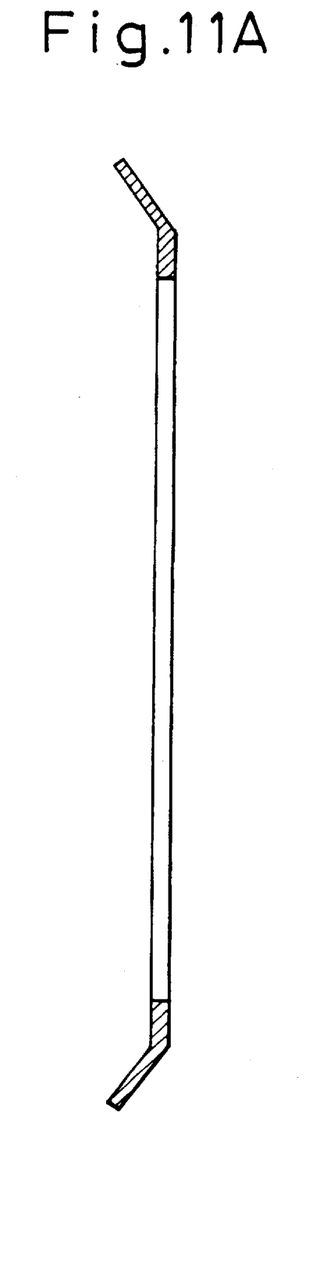
FIG. 11A and FIG. 11B illustrate a spring seat 8 used in the third embodiment.
Figure 11B:
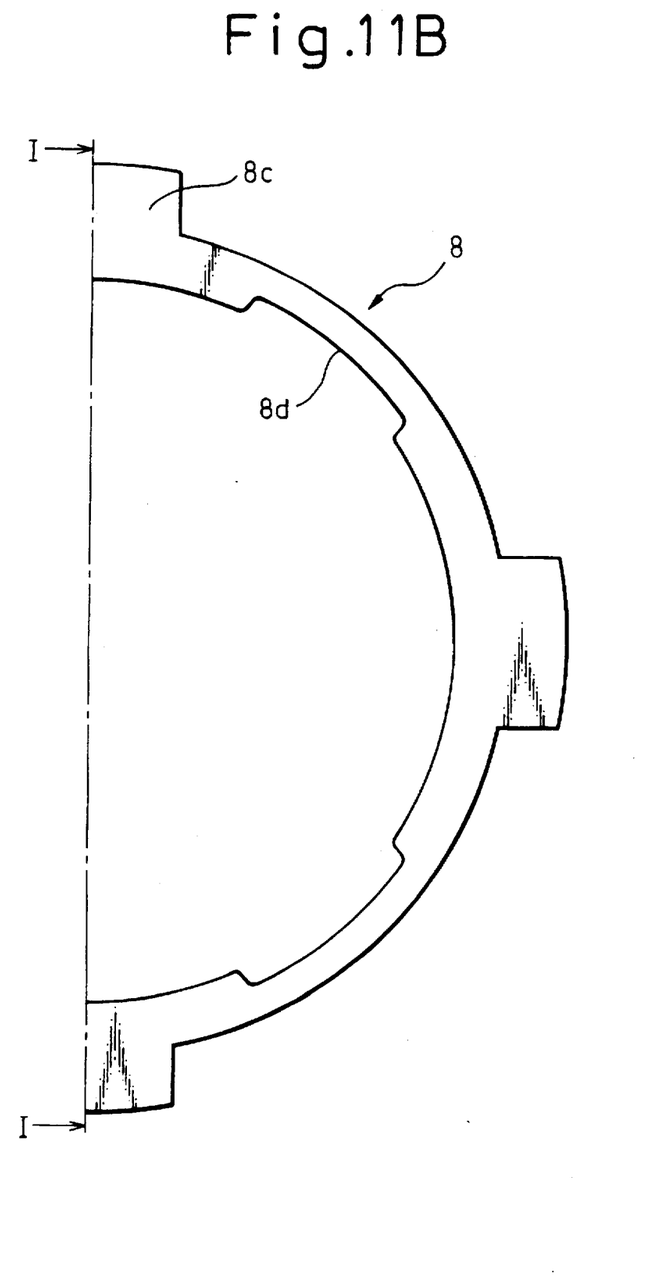

FIGS. 11A and 11B illustrate spring seat 8 used in the third embodiment. Compared to the spring seat shown in FIG. 3, a cone disc spring is employed at portion 8c, and thereby the return spring 10 which is employed in the first and second embodiments can be deleted. Further, the openings 8b used for connecting the second cam member 4 and the piston member 7 are replaced by a cut-off 8d.

As described, according to the present invention, the return spring is prevented from being dragged by rotation of the piston.

Accordingly, the return spring cam evenly expands and contracts, and thereby reliable operation and higher durability are obtainable.

We claim:

1. A frictional engagement device for engaging a pair of members relatively rotating around a common axis comprising:

a first frictional engaging element fitted unrotatably and axially movably to one of said relatively rotating members;

a second frictional engaging element unrotatably and axially movably fitted to the other of said relatively rotating members, said second frictional engaging element being disposed engageable to said first frictional engaging element;

a first cam member axially movably fitted to one of said relatively rotating member, said first cam member being disposed apart from said second frictional engaging element, said first cam member having a slanted cam surface;

a second cam member disposed adjacent to said first cam member on a side of said second frictional engaging element, said second cam member having a slanted cam surface parallelly opposing said cam surface of said first cam member;

a piston means fitted to said second cam member, said piston member having a surface engageable to said second frictional engagement element;

a spring seat disposed not touching said piston means in a space formed between said piston means and said second cam member;

a return spring for biasing said second cam member toward said first cam member, said return spring being fixed to an unmovable member on one end and being fitted said spring seat on the other end;

a pushing means for selectively pushing said piston means onto said second frictional element through said second cam member to cause a frictional engagement between said piston means and said second frictional element so that said piston member can be rotationally dragged by said second cam member and generates a cam force for engaging said first frictional engaging element and said second frictional element; and a friction decreasing means disposed between said spring seat and said second cam member for decreasing a friction between said spring seat and said second cam member so preventing said return spring from being rotationally dragged by said second cam member when said second cam member is rotationally dragged.

2. A frictional engagement device according to claim 1, wherein said friction decreasing means is rollers.

3. A frictional engagement device according to claim 2, wherein said rollers are arranged on said spring seat and are supported by a roller cage.

4. A frictional engagement device according to claim 1, wherein said friction decreasing means is a semi-cylindrical protuberance integrally formed on said second cam member.

5. A frictional engagement device according to claim 1, wherein said friction decreasing means is a semi-spherical protuberance integrally formed on said second cam member.

6. A frictional engagement device according to claim 1, wherein said friction decreasing means is a semi-cylindrical protuberance integrally formed on said spring seat.

7. A frictional engagement device according to claim 1, wherein said friction decreasing means is a semi-spherical protuberance integrally formed on said spring seat.

8. A frictional engagement device according to claim 1, wherein said friction decreasing means is rollers.

9. A frictional engagement device according to claim 1, wherein cam rollers are disposed between said cam surface of said first cam member and said cam surface of said second cam member.

10. A frictional engagement device according to claim 1, wherein said pushing means is means for supplying oil pressure between said first cam member and said second cam member.

11. A frictional engagement device according to claim 1, wherein a limiter means for limiting the rotation range of said second cam member is disposed.

* * * * *